United States Patent [19]
Dezelan

[11] 3,970,327
[45] July 20, 1976

[54] SUSPENSION AND LOAD LEVELING FOR AN URBAN HAULER

[75] Inventor: Joseph E. Dezelan, Joliet, Ill.

[73] Assignee: Caterpillar Tractor Co., Peoria, Ill.

[22] Filed: June 4, 1975

[21] Appl. No.: 583,365

[52] U.S. Cl.............................. 280/683; 280/6 H; 280/709
[51] Int. Cl.² ........................................ B06G 17/00
[58] Field of Search................. 280/104.5 R, 124 F, 280/6 H

[56] References Cited
UNITED STATES PATENTS

| | | | |
|---|---|---|---|
| 2,777,652 | 1/1957 | Grudin | 280/104.5 R |
| 2,970,848 | 2/1961 | Rice | 280/104.5 R |
| 3,690,688 | 9/1972 | Fleury | 280/6 H |

*Primary Examiner*—Philip Goodman
*Attorney, Agent, or Firm*—Phillips, Moore, Weissenberger Lempio & Strabala

[57] ABSTRACT

A tandem axle suspension assembly for a vehicle includes a pair of axles pivotally supported to the vehicle frame and including resilient means supporting the frame above each of the axles. The resilient means includes fluid cylinders for each of the axles and a source of fluid in open communication with both sets of cylinders and an accumulator to maintain an even load distribution on the respective axles. The fluid system includes a valve responsive to the position of one of the axles with respect to the frame to maintain the frame and axles at a predetermined distance apart. Means are also provided for raising one of the axles from contact with the supporting ground.

8 Claims, 1 Drawing Figure

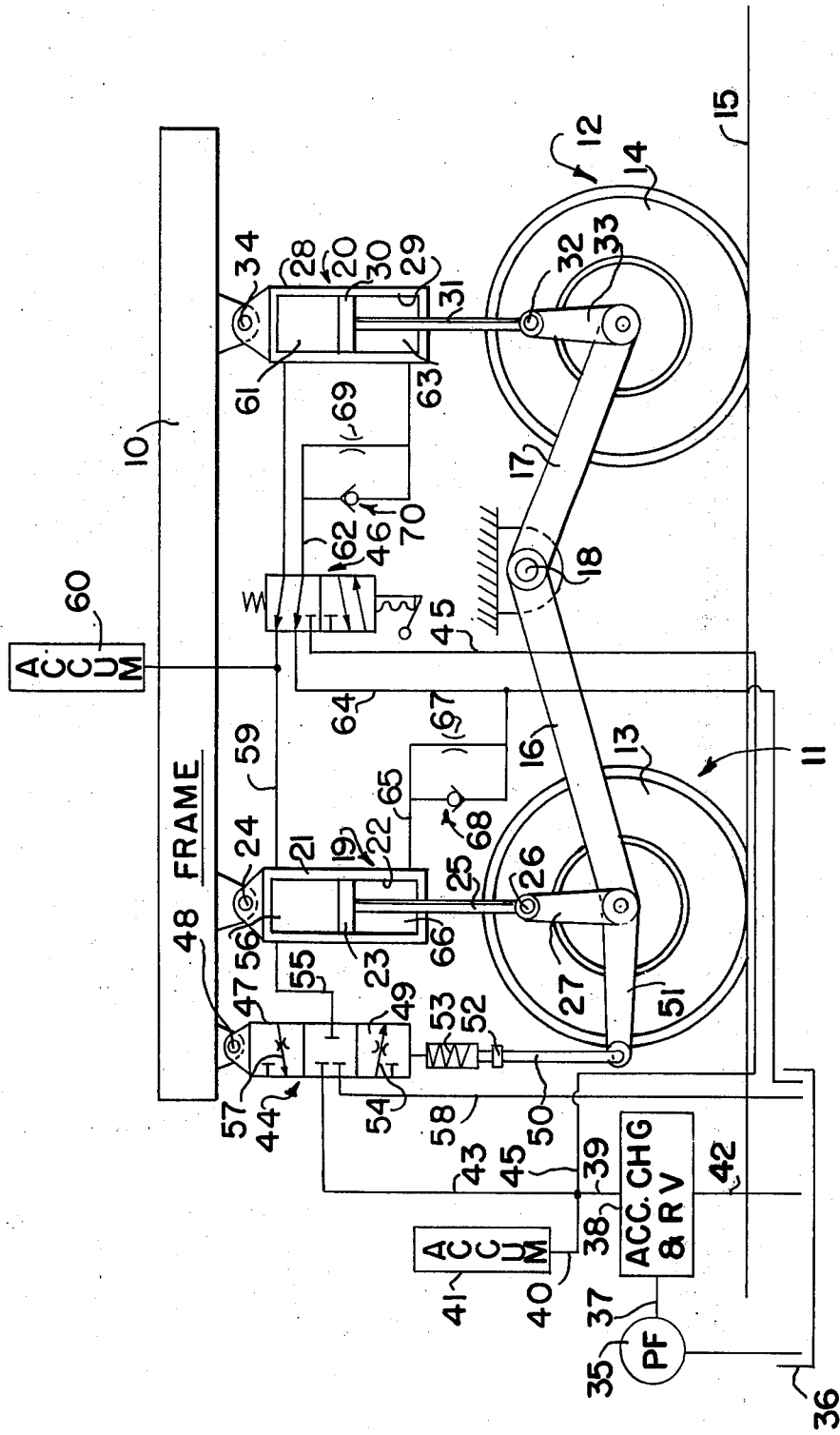

SUSPENSION AND LOAD LEVELING FOR AN URBAN HAULER

BACKGROUND OF THE INVENTION

The present invention relates to wheeled vehicles and pertains more particularly to a tandem axle suspension assembly for such vehicles.

Heavy duty vehicles such as trucks and trailers frequently employ tandem axles for better support of the load on the vehicle and better distribution of the load over the road surface. Such tandem axle assemblies normally employ resilient means for supporting the vehicle frame above the axles to provide a smoother line of the vehicle. However, such resilient means normally permit the height of the vehicle frame to vary in accordance with the load on the vehicle.

Another problem with such vehicles is that when the vehicle is traversing uneven terrain the load becomes unevenly distributed between the tandem axles. Such uneven distribution of the load can result in failure of the tires of the vehicle or the suspension itself.

Still another problem with such tandem axle vehicles is that the extra wheels in contact with the road surface provide high resistance to rolling of the vehicle when the vehicle is empty. This road resistance results in a higher consumption of fuel when the vehicle is traveling without load.

Numerous prior art suspension systems have been proposed for overcoming the various problems above. However, none of these have proven entirely satisfactory.

SUMMARY AND OBJECTS OF THE INVENTION

It is the primary object of the present invention to overcome the above problems of the prior art.

Another object of the present invention is to provide a vehicle suspension system that is effective to maintain the vehicle level and to equally distribute the load to the tandem wheels or axles of the vehicle.

A further object of the present invention is to provide a tandem axle suspension system for a vehicle that is effective to equally distribute the load to the axles and to maintain the load at a predetermined height.

Still another object of the present invention is to provide a tandem axle suspension system for a vehicle that is effective to maintain an equal distribution of load, and includes means for retracting the wheels on one of the axles from contact with the road surface under light or no load conditions.

In accordance with the primary aspect of the present invention, a vehicle is provided with a tandem axle assembly with resilient means for supporting the frame of the vehicle above the axles, and including a common fluid means for maintaining equal distribution of load on both axles, and including means for maintaining a predetermined height of the vehicle frame above the axles. One of the axles is provided with means for raising the wheels thereon above the road surface so that the frame is suspended or supported by a single axle.

BRIEF DESCRIPTION OF THE DRAWING

The above and other objects and advantages of the present invention will become apparent from the following description when read in conjunction with the drawings wherein:

The single FIGURE is an elevational view in schematic of a tandem support assembly in accordance with the present invention.

DETAILED DESCRIPTION OF THE PREFERRED EMBODIMENT

Turning now to the drawing, there is illustrated a vehicle frame 10 supported by a tandem axle assembly including a first axle assembly indicated generally at 11, and a second axle assembly indicated generally at 12, both of which are resiliently connected to the frame 10 for supporting it. The axle assemblies each include suitable wheels 13 and 14 which may, for example, include inflated rubber tires for supporting engagement with a suitable road surface or the ground 15.

The axle assemblies 11 and 12 are each pivotally connected in a suitable manner, such as by beams 16 and 17, to a common pivot 18 which is preferably secured to the frame 10.

The tandem axles 11 and 12 are further connected to the vehicle frame 10 by suitable resilient fluid systems comprising double-acting pistons in cylinder assemblies 19 and 20 connected respectively to the frame and to each of the axle assemblies. The fluid cylinder assembly 19 includes a cylindrical housing 21 having a bore 22 in which a doubleacting piston 23 is reciprocably mounted. The housing 21 is pivotally connected at 24 to the frame 10. The double-acting piston 23 includes a rod 25 which is connected by pivot means or pin 26 to the bracket 27 of the axle assembly 11.

The piston and cylinder assembly 20 is substantially identical to the assembly 19 and includes a cylinder housing 28 having a cylindrical bore 29 in which is reciprocably mounted a double-acting piston 30 which is connected by a suitable rod 31 by pivot means 32 to a bracket 33 of the axle assembly 12. Cylinder housing 28 is pivotally connected in a suitable manner by suitable pivot means 34 to the vehicle frame 10.

A suitable source of fluid is provided for supplying fluid for controlling the cylinder assemblies 19 and 20. The fluid may be of any type, but is preferably an incompressible hydraulic fluid and is from a suitable source which includes a pump 35 for drawing fluid from a sump or reservoir 36 and supplying it by way of a conduit 37 to an accumulator and a charging and relief valve 38. The accumulator and charging and relief valve 38 is operative to direct the fluid by way of conduit means 39 and branch conduit 40 to a charging or reserve accumulator 41. When the pressure within the accumulator 41 reaches a certain predetermined level, the charging valve is operative to bypass the fluid, by way of conduit 42, back to tank or sump 36. This charging or reserve accumulator 41 maintains a ready supply of pressurized fluid for the system.

The supply conduit 39 also supplies fluid by way of a second branch conduit 43 to a leveling valve 44 and by way of a third branch conduit 45 to a manually operable control valve 46 for controlling the fluid directly to the piston and cylinder assembly 20 for controlling the axle assembly 12.

The leveling valve 44 includes a housing portion 47 which is connected by suitable pivot means 48 to the frame 10. The valve spool 49 is reciprocably mounted within the housing 47 and is connected by an adjustable link 50 to an arm or bracket 51. The link 50 includes adjustable means 52 and resilient means 53. The adjustable means is to permit the adjustment of the valve spool 49 with respect to the bracket 51 and similarly the entire adjustment of the position of the frame 10 above the axle assembly 11.

The valve spool 49 is movable within housing 47 when the axle 11 moves with respect to the frame 10 to provide communication such as by way of a passage 54 from conduit 43 to a conduit 55 for supplying fluid to a chamber 56 at the head of the piston 23 to supply fluid for supporting the frame 10 with respect to the axle assembly 11. The valve spool 49 is further movable downward with respect to the frame 10 to provide communication between the passage 55 and chamber 56 by way of a passage 57 to a return or exhaust passage 58 for exhausting fluid from the chamber 56 to the piston and cylinder assembly 19.

Suitable conduit means 59 provides open communication between the piston and cylinder assemblies 19 and 20, and further communicates the fluid from the source to second accumulator means 60 which is normally in constant communication with both of the piston and cylinder assemblies 19 and 20. The accumulator 60 serves as the resilient means or the spring of the system. This accumulator may be of any suitable type such as gas or spring biased and will have sufficient pressure to support the vehicle and its load.

The fluid communicated by way of conduit 59 communicates to the head end of piston 30 to chamber 61 defined therein for supporting the load of the frame 10 on the axle assembly 12. With this open communication between the two piston and cylinder assemblies, the fluid is free to flow back and forth therebetween so that should either of the axle assemblies 11 or 12 ride upon uneven terrain and rise with respect to the frame 10, the fluid therein will flow along the conduit means 59 and to the chamber 56 or 61 and accumulator 60 and thereby distribute the load evenly between the axle assemblies 11 and 12. The valve 46 is biased to its illustrated position to provide open communication of line 59 with chamber 61 of piston and cylinder assembly 20. The valve is operative upon being shifted to a second position to provide communication of fluid by way of conduit means 45 and conduit means 62 to chamber 63 at the rod end of the cylinder 28.

Pressurized fluid introduced into the chamber 63 acting on the rod end of piston 30 will draw the axle assembly upward such that the wheels 14 are no longer in contact with the road surface 15 and thus the entire vehicle frame assembly 10 is supported by the axle assembly 11. This is a convenient means when the vehicle is not loaded for cutting down road resistance. Thus, with only the wheels of the axle assembly 11 in contact with the road surface 15, the road resistance is considerably reduced. A fluid from chamber 61 is returned to the tank 36 by way of conduit means 64 from valve 46.

Each of the piston cylinder assemblies 19 and 20 is provided with damping means for damping the pistons 23 and 30 within the cylinders 21 and 28. The damping means for piston cylinder assembly 19 includes conduit means 65 in communication with the chamber 66 defined at the rod end of the piston 23 for communicating that end of the piston by way of a restrictive passage including restriction means 67 to a return passage 64. Thus, the fluid or flow of fluid from the chamber is restricted by means of restriction means 67 as it moves out of the chamber 66. A parallel conduit means including a check valve 68 is provided parallel to the restriction means 67 to provide free open communication of fluid from the sump or tank 36 to the rod end chamber 66 of the cylinder assembly 19. Thus, the flow of fluid from the chamber 66 is damped while the return fluid is permitted to freely flow thereto. However, it would be appreciated that the movement of the piston will be restricted or restrained by the pressure within the chamber 66.

The piston cylinder assembly 20 includes similar damping means including a restriction 69 within conduit means 62 which communicates fluid from the rod end chamber 63 of the piston cylinder assembly 20 by way of the conduit 62 and valve 46 to the return conduit 64 for returning the fluid to the tank or sump 36. Similarly, a check valve 70 parallel to the restriction 69 permits free flow of the fluid into the chamber 63 where it forces the fluid to bypass the check valve 70 and flow by way of restriction 69 to the tank 36.

From the above description it is seen that there is disclosed a suspension assembly for a vehicle having tandem axles with resilient means for adjusting the load distribution between the axles as well as adjusting the height of the vehicle frame above the axle assemblies. Means are provided for raising the wheels of one of the axle assemblies from the roadway surface when, for example, the axle is not needed for supporting the load on the vehicle.

While the present invention has been described and illustrated by means of a specific embodiment, it is to be understood that numerous changes and modifications may be made therein without departing from the spirit and scope of the invention as defined in the appended claims.

I claim:

1. A suspension for a vehicle comprising the combinations of:
   a vehicle frame;
   first and second axles mounted in tandem beneath said frame;
   means for separately, pivotally connecting said axles to said frame for pivotal movement toward and away from said frame;
   first and second fluid controlled resilient means respectively connected between each of said first and second axles and said frame for resiliently supporting said frame by said axles;
   means for communicating a fluid to said resilient means for maintaining a predetermined relative height of said frame above said axles and an equal distribution of weight on said axles.
   said resilient means comprises a double-acting piston and cylinder assembly connecting each of said axles to said frame;
   a common source of pressurized fluid for supplying fluid to said cylinders for supporting said frame;
   valve means responsive to a predetermined position of one of said axles with respect to said frame for communicating fluid from said source to said cylinders; and,
   accumulator means for accumulating a quantity of said fluid and maintaining said fluid in open communication with both of said cylinders for resilient support of said frame by said axles.

2. The suspension of claim 1 including means for raising one of said axles from said frame supporting position to a position of support by said frame.

3. The suspension of claim 1 wherein said means for pivotally connecting said axles to said frame comprises first and second beams pivotally connected at common pivot means to said frame, and said first beam being connected to said first axle and said second beam connected to said second axle.

4. A suspension for a vehicle comprising the combination of;
   a vehicle frame;
   first and second axles mounted in tandem beneath said frame;
   means for separately, pivotally connecting said axles to said frame for pivotal movement toward and away from said frame;
   first and second fluid controlled resilient means respectively connected between each of said first and second axles and said frame and including a double-acting piston and cylinder assembly connecting each of said axles to said frame for resiliently supporting said frame by said axles;
   a common source of incompressible pressurized fluid for supplying fluid to said cylinders for supporting said frame;
   means including valve means responsive to a predetermined position of one of said axles with respect to said frame for communicating fluid from said source to said cylinders for maintaining a predetermined relative height of said frame above said axles and an equal distribution of weight on said axles; and,
   accumulator means for accumulating a quantity of said fluid connected for maintaining said fluid in open communication with both of said cylinders for resilient support of said frame by said axles.

5. The suspension of claim 4 wherein said means for pivotally connecting said axles to said frame comprises first and second beams pivotally connected at common pivot means to said frame, and said first beam being connected to said first axle and said second beam being connected to said second axle.

6. The suspension of claim 1 including means for raising one of said axles from said frame supporting position to a position of support by said frame.

7. The suspension of claim 1 wherein said means for pivotally connecting said axles to said frame comprises first and second beams pivotally connected at common pivot means to said frame, and said first beam being connected to said first axle and said second beam being connected to said second axle.

8. The suspension of claim 1 comprising means for adjusting the height of said frame above said axles.

* * * * *